(12) United States Patent
Macauley et al.

(10) Patent No.: US 7,647,560 B2
(45) Date of Patent: Jan. 12, 2010

(54) USER INTERFACE FOR MULTI-SENSORY EMOTICONS IN A COMMUNICATION SYSTEM

(75) Inventors: James David Macauley, Bellevue, WA (US); Erik John Arthur, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 794 days.

(21) Appl. No.: 10/886,533

(22) Filed: Jul. 9, 2004

(65) Prior Publication Data

US 2006/0025220 A1    Feb. 2, 2006

Related U.S. Application Data

(63) Continuation of application No. 10/864,540, filed on Jun. 10, 2004, now abandoned.

(60) Provisional application No. 60/569,614, filed on May 11, 2004.

(51) Int. Cl.
*G06F 3/00* (2006.01)
*G06F 3/01* (2006.01)
*G06F 15/16* (2006.01)

(52) U.S. Cl. .................. 715/758; 715/753; 715/701; 715/702; 709/206

(58) Field of Classification Search ................ 709/204, 709/206; 715/758, 753, 701, 702
See application file for complete search history.

(56) References Cited

U.S. PATENT DOCUMENTS

| | | | | |
|---|---|---|---|---|
| 5,596,690 A | * | 1/1997 | Stone et al. ................. 345/630 |
| 6,071,194 A | * | 6/2000 | Sanderson et al. ............ 463/37 |
| 6,102,802 A | * | 8/2000 | Armstrong ................... 463/37 |
| 6,784,901 B1 | * | 8/2004 | Harvey et al. ................ 715/757 |
| 6,963,839 B1 | * | 11/2005 | Ostermann et al. .......... 704/260 |
| 6,987,514 B1 | * | 1/2006 | Beresin et al. .............. 345/473 |
| 7,089,292 B1 | | 8/2006 | Roderick et al. |
| 7,159,008 B1 | * | 1/2007 | Wies et al. .................. 709/206 |
| 7,234,117 B2 | * | 6/2007 | Zaner et al. ................. 715/758 |
| 2001/0036860 A1 | * | 11/2001 | Yonezawa ..................... 463/30 |
| 2001/0044725 A1 | * | 11/2001 | Matsuda et al. ............. 704/269 |

(Continued)

OTHER PUBLICATIONS

M. Rauterberg, "Natural User Interface (NUI): a case study of a video based interaction technique for a computer game", HCI International '97, Aug. 24-29, 1997, vol. 2, pp. 253-256.

(Continued)

*Primary Examiner*—George C Neurauter, Jr.
*Assistant Examiner*—Mark D Fearer
(74) *Attorney, Agent, or Firm*—Woodcock Washburn LLP

(57) ABSTRACT

Methods and systems for providing dynamic emoticons during chat sessions across game consoles are disclosed. A dynamic emoticon may include haptic, visual, and/or auditory components. Each component may have an associated intensity level, e.g., based on a pressure with which a user of the game console presses a controller button or actuates a control input. The emoticon's auditory component may include or identify a sound effects filter or a known audio file; the emoticon's visual component may include or identify a visual effects filter or a known video or graphic file; the emoticon's haptic component may cause vibration of or force feedback on the controller. Emoticons may be sent from one voice chat participant's game console to another voice chat participant's game console across a network such as the Internet.

23 Claims, 8 Drawing Sheets

U.S. PATENT DOCUMENTS

| | | | |
|---|---|---|---|
| 2003/0018755 A1* | 1/2003 | Masterson et al. | 709/220 |
| 2004/0030787 A1* | 2/2004 | Jandel et al. | 709/229 |
| 2004/0117044 A1* | 6/2004 | Konetski | 700/94 |
| 2004/0165544 A1* | 8/2004 | Cornett et al. | 370/254 |
| 2005/0039035 A1* | 2/2005 | Clowes | 713/193 |
| 2005/0080866 A1* | 4/2005 | Kent et al. | 709/207 |

OTHER PUBLICATIONS

Kerry Bodine et al., "Kinetic Typography-Based Instant Messaging", CHI 2003, Apr. 5-10, 2003, pp. 914-915.

Geoff Hart, "The Periodic Table of Emoticons", CHEMTECH, Oct. 1999, 1 page.

Joseph B. Walther et al., "The Impacts of Emoticons on Message Interpretation in Computer-Mediated Communication", Social Science Computer Review, vol. 19, No. 3, Fall 2001, pp. 324-347.

Digit, "Feels like Canada Calling: My Phone is Shivering!", printed from http://www.dig-it.com/print.php?sid=38 on Apr. 30, 2004, 2 pages.

Immersion Corporation—Gaming, printed from http://www.immersion.com/gaming on Apr. 30, 2004, 1 page.

Immersion Corporation—Welcome to the Immersion Web Site, printed from http://immr.client.shareholder.com/ReleaseDetail.cfm?ReleaseID=111399 on Apr. 30, 2004, 2 pages.

Smileys And Emoticons For Email and IM, printed from http://www.windweaver.com/emoticon.htm on Apr. 30, 2004, 3 pages.

High-Tech Dictionary Emoticons, printed from http://www.computeruser.com/resources/dictionary/emoticons.html on Apr. 30, 2004, 3 pages.

Emoticons, printed from http://www.cknow.com/ckinfo/emoticons.htm on Apr. 30, 2004, 31 pages.

TeamSpeak—the teamplay engine, printed from http://www.teamspeak.org/modules.php?op=modload&name=About&file=index on Apr. 8, 2004. 4 pages.

Kurt Saar, "VIRTUS: A Collaborative Multi-User Platform", ACM, 1999, pp. 141-152.

Uschi Felix, "The web as a vehicle for constructivist approaches in language teaching", Cambridge University, 2002, pp. 2-15.

Shin-ichi Hanaki et al., "Experiences in VILLA—A Mixed Reality Space to Support Group Activities", CVE '02, Sep. 30-Oct. 2, 2002, pp. 155-156.

Sumedha Kshirsagar et al., "Avatar Markup Language", Eigth Eurographics Workshop on Virtual Environments, 2002, pp. 169-177.

Jim Larson, "Multi-User Virtual Spaces", SIGGROUP Bulletin, vol. 18, No. 2, Aug. 1997, pp. 32-33.

Shadid Parvez et al., "A speech coder for PC multimedia net-to-net communication", International Journal of Communication Systems, 2001, pp. 680-694.

Tapas K. Das et al., "NetEffect: A Network Architecture for Large-scale Multi-user Virtual Worlds", ACM VRST '97, pp. 157-163.

Bernie Roehl, "Online Traveler, -Shared Worlds-", VR News, vol. 8, No. 9, Nov. 1999, pp. 14-17.

Roy Rodenstein et al., "Talking In Circles: Designing A Spatially-Grounded Audioconferencing Environment", CHI Letters, vol. 2, Issue 1, Apr. 2000, pp. 81-88.

Milton Chen, "Achieving Effective Floor Control with a Low-Bandwidth Gesture-Sensitive Videoconferencing System", Multimedia '02, Dec. 1-6, 2002, pp. 476-483.

Elisabeth Cuddihy et al., "Embodied Interaction in Social Virtual Environments", ACM, 2000, pp. 181-188.

Rana El Kaliouby et al., "FAIM: Integrating Automated Facial Affect Analysis in Instant Messaging", IUI '04, Jan. 13-16, 2004, pp. 244-246.

Judith B. Harris et al., "Participating from the Sidelines, Online' Facilitating Telementoring Projects", ACM Journal of Computer Documentation, Nov. 2000, vol. 24, No. 4, pp. 227-236.

David Kurlander et al., "Comic Chat", ACM, 1996, pp. 225-236.

Jenny Preece, "Emphatic Communities: Reaching Out Across the Web", interactions, Mar.-Apr. 1998, pp. 32-43.

In the United States Patent and Trademark Office, Final Office Action in re:. U.S. Appl. No. 10/864,540, filed Jun. 10, 2004, dated Mar. 3, 2009, 27 pages.

* cited by examiner

USER INTERFACE FOR MULTI-SENSORY EMOTICONS IN A COMMUNICATION SYSTEM

This application claims priority to Provisional Application Ser. No. 60/569,614, filed May 11, 2004, entitled "Dynamic Emoticons," and application Ser. No. 10/864,540, entitled "Multi-Sensory Emoticons in a Communication System," filed Jun. 10, 2004.

FIELD OF THE INVENTION

The invention relates generally to computer games, video games, and game consoles. More specifically, the invention provides a method of providing a voice chat service on a main control application on a video game console when no game is otherwise being played by a user of the game console.

BACKGROUND OF THE INVENTION

Computer games, video games, arcade games, and other forms of electronic games have advanced from simple games such as Pong, Breakout, Asteroids, and Space Invaders to complex, multiplayer, online high-resolution games such as CRIMSON SKIES®, published by Microsoft Game Studios of Redmond Wash.

Initial online multiplayer games had no mechanism for players to communicate with each other while playing the game, unless the players were either physically located near each other or communicated through a separate medium such as a separate telephone call. As online gaming progressed, online games began providing players limited communication capabilities, such as being able to text chat while playing the game.

With the launch of XBOX® LIVE by Microsoft Corporation of Redmond, Wash. in November 2002 came in-game voice chat capabilities. Microsoft provides a software development kit (SDK) for XBOX® LIVE with which game developers can include voice chat support in their game titles. In order for two players to chat, they must have the same game title executing on their respective game consoles, and both be signed in to the XBOX® LIVE online gaming environment.

When two players do not have the same game title executing on their respective XBOX® game consoles, they cannot voice chat with each other. Instead, one must send the other an invitation for a specific game, and the recipient of the invitation must change game media to the specific game. Even then, players must typically match up to play a game before they will be able to voice chat with one another. If the two players subsequently decide to play a different game, then the players must change media again to be able to continue voice chatting, making game coordination lengthy and difficult.

Another problem that often occurs is the inability of a player to adequately respond to a game invitation beyond simply selecting not to join the Friend. The invited gamer might not currently wish to play or may want to but lack the specified game disc. This would result in gamers either not matching up to play or spending excess time inviting each other back and forth until stumbling upon a game that both were able to play.

Thus it would be an advancement in the art to provide a mechanism for gamers to connect and carry on real-time voice communications without requiring that each gamer have the same game media loaded in their respective game consoles, thus creating an opportunity for expanded community, building relationships, and allowing gamers the opportunity to "meet up" with Friends online in order to talk and plan out game title selections and game times.

Regardless of the environment in which the chat sessions occur, however, present chat applications provide only limited mechanisms by which players can communicate. That is, in a text chat, players can only type back and forth, with limited expression in the form of emoticons. Basic emoticons are include the following:

:-) or :) Basic smiling face; used for humor and sometimes sarcasm

:-( or :( Basic frowning face; used for sadness or anger

;-) or ;) Half-smiling or winking face; more often used for sarcasm

:-/ Wry face; used for wry humor

Similarly, in a voice chat, players can only speak to each other, without the advantage of any emoticons because there is no text involved in a voice chat. Text chat systems and electronic mail have enabled users only to send text-based emoticons, but no system has created a two-way real-time voice chat capability or allowed user to not only send iconic emoticons but to also send sound alerts and to affect the actual hardware of the other user's system. Thus, it would be a further advancement in the art to provide new mechanisms of communication in a voice, audio, and/or video chat session that allow interacting users to convey emotions, actions, and the like.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to dynamic emoticons in a chat session across data processing systems capable of executing entertainment applications.

According to a first aspect of the invention, an emoticon may include a haptic component, e.g., causing vibration or force feedback to occur on a game controller.

According to another aspect of the invention, an emoticon may include an intensity level, e.g., defining an intensity of a haptic or visual component, or to determine the volume of an auditory component.

According to another aspect of the invention, an emoticon may be defined by a custom script created by a participant in a chat session. The script may define emoticon elements (e.g., haptic, visual, and auditory) and may further define element actions.

According to another aspect of the invention, an emoticon may include an auditory component identifying or defining an audio file for playback, or a sound effects filter for altering audio otherwise output by the data processing system According to another aspect of the invention, a gaming system having a data processing unit, a controller, a network port, and a memory may provide a dynamic emoticon functionality. The gaming system executes entertainment applications from a media drive, and executes the voice chat application from a memory. The controller comprises a plurality of control inputs (e.g., buttons, joysticks, triggers, etc.) for providing input to the gaming system. The network port allows communication with other gaming systems over a network such as the Internet. The resident memory stores the voice chat application as computer executable code for generating an emoticon message based on user input received from the controller.

Aspects of the invention also provide methods for sending and receiving dynamic emoticon messages.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
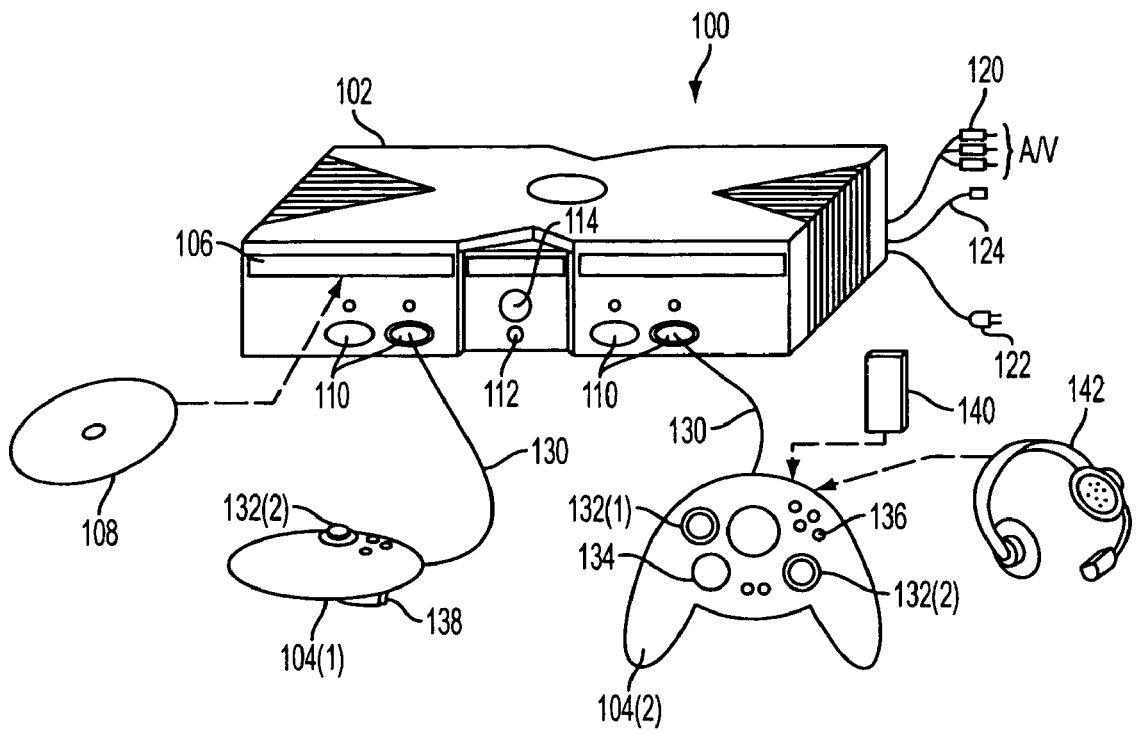
FIG. 1 illustrates a gaming system that may be used according to an illustrative embodiment of the invention.

FIG. 1 illustrates an example of a suitable gaming system environment 100 on which computer games, video games, and or other electronic games (collectively referred to herein as computer games) may be played. The gaming system environment 100 is only one example of a suitable computing environment and is not intended to suggest any limitation as to the scope of use or functionality of the invention. Neither should the gaming system environment 100 be interpreted as having any dependency or requirement relating to any one or combination of components illustrated in the illustrative operating gaming system environment 100.

The invention is operational with numerous other general purpose or special purpose computing system environments or configurations. Examples of well known computing systems, environments, and/or configurations that may be suitable for use with the invention include, but are not limited to, personal computers; server computers; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; electronic game consoles, distributed computing environments that include any of the above systems or devices; and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 1 shows an exemplary gaming system 100. Gaming system 100 may include a game console 102 and up to four controllers, as represented by controllers 104(1) and 104(2). The game console 102 is equipped with an internal hard disk drive and a portable media drive 106 that supports various forms of portable storage media as represented by optical storage disc 108. Examples of suitable portable storage media include DVD, CD-ROM, game discs, and so forth.

Game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

Game console 102 may connect to a television or other display (not shown) via A/V interfacing cables 120. A power cable 122 provides power to the game console. Game console 102 may further be configured with broadband network capabilities, as represented by the cable or modem connector 124 to facilitate access to a network, such as the Internet.

Each controller 104 may be coupled to the game console 102 via a wire or wireless interface. In the illustrated implementation, the controllers are USB (Universal Serial Bus) compatible and are connected to the console 102 via USB cables 130. Controller 102 may be equipped with any of a wide variety of user interaction mechanisms. As illustrated in FIG. 1, each controller 104 is equipped with two thumbsticks 132(1) and 132(2), a D-pad 134, buttons 136 (e.g., 'A', 'B', 'X', 'Y'), and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and user accounts, and port them for play on other consoles. In the described implementation, each controller is configured to accommodate two memory units 140, although more or less than two units may be employed in other implementations. A headset 142 may be connected to the controller 104 or game console 102 to provide audio communication capabilities. Headset 142 may include a microphone for audio input and one or more speakers for audio output.

Gaming system 100 is capable of playing, for example, games, music, and videos. With the different storage offerings, titles can be played from the hard disk drive or the portable medium 108 in drive 106, from an online source, or from a memory unit 140. For security, in some embodiments executable code can only be run from the portable medium 108. A sample of what gaming system 100 is capable of playing include game titles played from CD and DVD discs, from the hard disk drive, or from an online source; digital music played from a CD in the portable media drive 106, from a file on the hard disk drive (e.g., Windows Media Audio (WMA) format), or from online streaming sources; and digital audio/video played from a DVD disc in the portable media drive 106, from a file on the hard disk drive (e.g., Active Streaming Format), or from online streaming sources.

Figure 2:
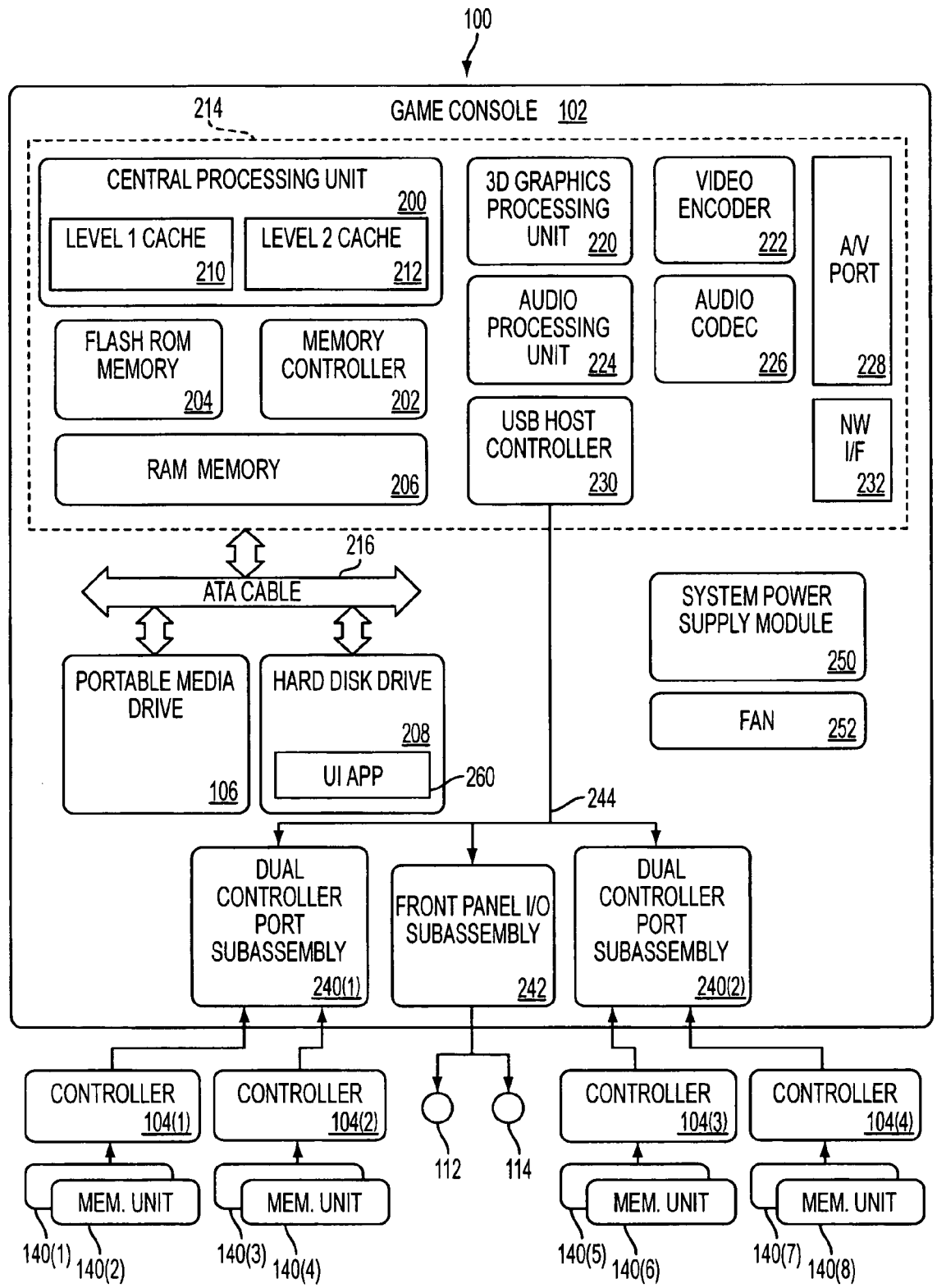
FIG. 2 illustrates a block diagram of the gaming system shown in FIG. 1.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 and a ROM bus (not shown). RAM 206 is configured as multiple DDR SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. This network gaming environment is described next.

Figure 3:
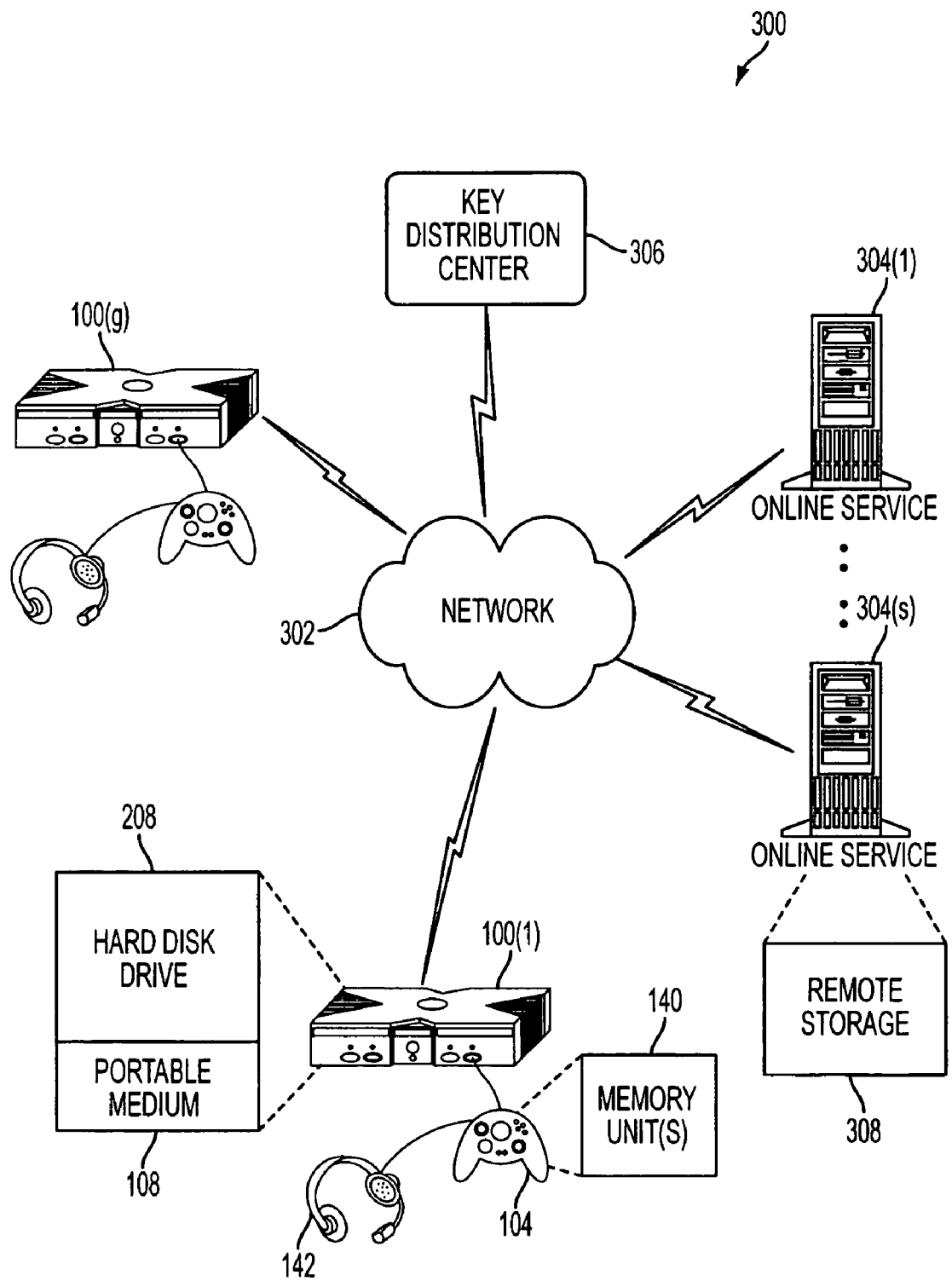
FIG. 3 illustrates a block diagram of a network gaming system according to an illustrative embodiment of the invention.

FIG. 3 shows an exemplary network gaming environment 300 that interconnects multiple gaming systems 100(1), . . . , 100(g) via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304(1), ..., 304(s) may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100—online storage. In addition to the portable storage medium 108, the hard disk drive 208, and the memory unit(s) 140, the gaming system 100(1) can also access data files available at remote storage locations via the network 302, as exemplified by remote storage 308 at online service 304(s).

Figure 4:
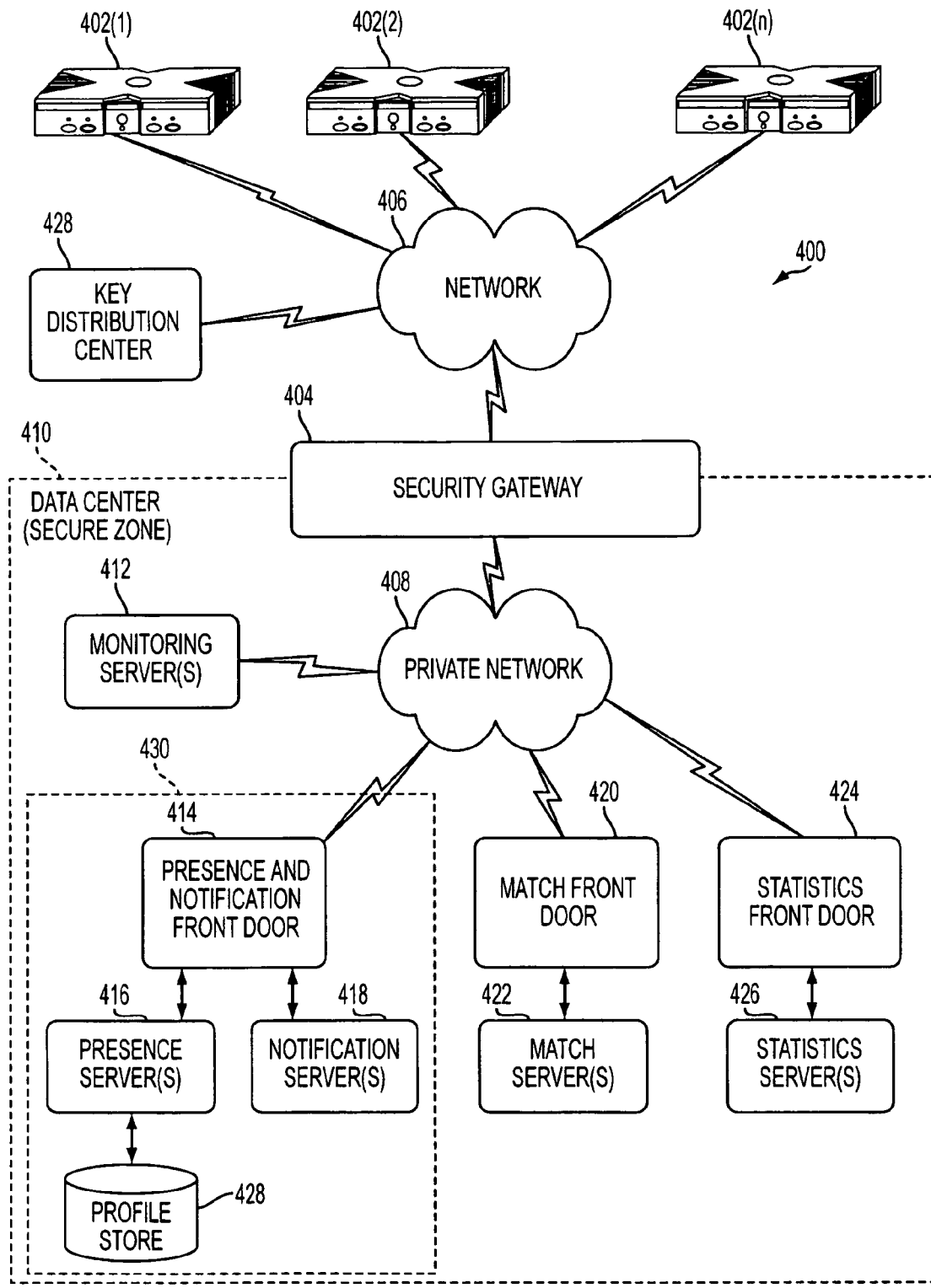
FIG. 4 illustrates another block diagram of an online gaming environment according to an illustrative embodiment of the invention.

FIG. 4 is a block diagram of another illustrative online gaming environment 400, e.g. XBOX® LIVE by Microsoft Corporation of Redmond, Wash. Multiple game consoles 402 (1), 402(2), ..., 402(n) are coupled to a security gateway 404 via a network 406. Each game console 402 can be, for example, a game console 102 of FIG. 1 or FIG. 2. Network 406 represents any one or more of a variety of conventional data communications networks. Network 406 will typically include packet switched networks, but may also include circuit switched networks. Network 406 can include wire and/or wireless portions. In one exemplary implementation, network 406 includes the Internet and may optionally include one or more local area networks (LANs) and/or wide area networks (WANs). At least a part of network 406 is a public network, which refers to a network that is publicly-accessible. Virtually anyone can access the public network.

In some situations, network 406 includes a LAN (e.g., a home network), with a routing device situated between game console 402 and security gateway 404. This routing device may perform network address translation (NAT), allowing the multiple devices on the LAN to share the same IP address on the Internet, and also operating as a firewall to protect the device(s) on the LAN from access by malicious or mischievous users via the Internet.

Security gateway 404 operates as a gateway between public network 406 and a private network 408. Private network 408 can be any of a wide variety of conventional networks, such as a local area network. Private network 408, as well as other devices discussed in more detail below, is within a data center 410 that operates as a secure zone. Data center 410 is made up of trusted devices communicating via trusted communications. Thus, encryption and authentication within secure zone 410 is not necessary. The private nature of network 408 refers to the restricted accessibility of network 408—access to network 408 is restricted to only certain individuals (e.g., restricted by the owner or operator of data center 410).

Security gateway 404 is a cluster of one or more security gateway computing devices. These security gateway computing devices collectively implement security gateway 404. Security gateway 404 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 410 are: one or more monitoring servers 412; one or more presence and notification front doors 414, one or more presence servers 416, one or more notification servers 418, and a profile store 428 (collectively implementing a presence and notification service or system 430); one or more match front doors 420 and one or more match servers 422 (collectively implementing a match service); and one or more statistics front doors 424 and one or more statistics servers 426 (collectively implementing a statistics service). The servers 416, 418, 422, and 426 provide services to game consoles 402, and thus can be referred to as service devices. Other service devices may also be included in addition to, and/or in place of, one or more of the servers 416, 418, 422, and 426. Additionally, although only one data center is shown in FIG. 4, alternatively multiple data centers may exist with which game consoles 402 can communicate. These data centers may operate independently, or alternatively may operate collectively (e.g., to make one large data center available to game consoles 102,402).

Game consoles 402 are situated remotely from data center 410, and access data center 410 via network 406. A game console 402 desiring to communicate with one or more devices in the data center logs in to the data center and establishes a secure communication channel between the console 402 and security gateway 404. Game console 402 and security gateway 404 encrypt and authenticate data packets being passed back and forth, thereby allowing the data packets to be securely transmitted between them without being understood by any other device that may capture or copy the data packets without breaking the encryption. Each data packet communicated from game console 402 to security gateway 404, or from security gateway 404 to game console 402 can have data embedded therein. This embedded data is referred to as the content or data content of the packet. Additional information may also be inherently included in the packet based on the packet type (e.g., a heartbeat packet).

The secure communication channel between a console 402 and security gateway 404 is based on a security ticket. Console 402 authenticates itself and the current user(s) of console 402 to a key distribution center 428 and obtains, from key distribution center 428, a security ticket. Console 402 then uses this security ticket to establish the secure communication channel with security gateway 404. In establishing the secure communication channel with security gateway 404, the game console 402 and security gateway 404 authenticate themselves to one another and establish a session security key that is known only to that particular game console 402 and the security gateway 404. This session security key is used to encrypt data transferred between the game console 402 and the security gateway cluster 404, so no other devices (including other game consoles 402) can read the data. The session security key is also used to authenticate a data packet as being from the security gateway 404 or game console 402 that the data packet alleges to be from. Thus, using such session security keys, secure communication channels can be established between the security gateway 404 and the various game consoles 402.

Once the secure communication channel is established between a game console 402 and the security gateway 404, encrypted data packets can be securely transmitted between the two. When the game console 402 desires to send data to a particular service device in data center 410, the game console 402 encrypts the data and sends it to security gateway 404 requesting that it be forwarded to the particular service device(s) targeted by the data packet. Security gateway 404 receives the data packet and, after authenticating and decrypting the data packet, encapsulates the data content of the packet into another message to be sent to the appropriate service via private network 408. Security gateway 404 determines the appropriate service for the message based on the requested service(s) targeted by the data packet.

Similarly, when a service device in data center 410 desires to communicate data to a game console 402, the data center sends a message to security gateway 404, via private network 408, including the data content to be sent to the game console 402 as well as an indication of the particular game console 402 to which the data content is to be sent. Security gateway 404 embeds the data content into a data packet, and then encrypts the data packet so it can only be decrypted by the particular game console 402 and also authenticates the data packet as being from the security gateway 404.

Although discussed herein as primarily communicating encrypted data packets between security gateway 404 and a game console 402, alternatively some data packets may be partially encrypted (some portions of the data packets are encrypted while other portions are not encrypted). Which portions of the data packets are encrypted and which are not can vary based on the desires of the designers of data center 410 and/or game consoles 402. For example, the designers may choose to allow voice data to be communicated among consoles 402 so that users of the consoles 402 can talk to one another—the designers may further choose to allow the voice data to be unencrypted while any other data in the packets is encrypted. Additionally, in another alternative, some data packets may have no portions that are encrypted (that is, the entire data packet is unencrypted). It should be noted that, even if a data packet is unencrypted or only partially encrypted, all of the data packet can still be authenticated.

Each security gateway device in security gateway 404 is responsible for the secure communication channel with typically one or more game consoles 402, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this may be explicit, such as each security gateway device maintaining a table of game consoles handled by the other security gateway devices, or alternatively implicit, such as determining which security gateway device is responsible for a particular game console based on an identifier of the game console.

Monitoring server(s) 412 operate to inform devices in data center 410 of an unavailable game console 402 or an unavailable security gateway device of security gateway 404. Game consoles 402 can become unavailable for a variety of different reasons, such as a hardware or software failure, the console being powered-down without logging out of data center 410, the network connection cable to console 402 being disconnected from console 402, other network problems (e.g., the LAN that the console 402 is on malfunctioning), etc. Similarly, a security gateway device of security gateway 404 can become unavailable for a variety of different reasons, such as hardware or software failure, the device being powered-down, the network connection cable to the device being disconnected from the device, other network problems, etc.

Each of the security gateway devices in security gateway 404 is monitored by one or more monitoring servers 412, which detect when one of the security gateway devices becomes unavailable. In the event a security gateway device becomes unavailable, monitoring server 412 sends a message to each of the other devices in data center 410 (servers, front doors, etc.) that the security gateway device is no longer available. Each of the other devices can operate based on this information as it sees fit (e.g., it may assume that particular game consoles being managed by the security gateway device are no longer in communication with data center 410 and perform various clean-up operations accordingly). Alternatively, only certain devices may receive such a message from the monitoring server 412 (e.g., only those devices that are concerned with whether security gateway devices are available).

Security gateway 404 monitors the individual game consoles 402 and detects when one of the game consoles 402 becomes unavailable. When security gateway 404 detects that a game console is no longer available, security gateway 404 sends a message to monitoring server 412 identifying the unavailable game console. In response, monitoring server 412 sends a message to each of the other devices in data center 410 (or alternatively only selected devices) that the game console is no longer available. Each of the other devices can then operate based on this information as it sees fit.

Presence server(s) 416 hold and process data concerning the status or presence of a given user logged in to data center 410 for online gaming. Notification server(s) 418 maintains multiple notification queues of outgoing messages destined for a player logged in to data center 410. Presence and notification front door 414 is one or more server devices that operate as an intermediary between security gateway 404 and servers 416 and 418. One or more load balancing devices (not shown) may be included in presence and notification front door 414 to balance the load among the multiple server devices operating as front door 414. Security gateway 404 communicates messages for servers 416 and 418 to the front door 414, and the front door 414 identifies which particular server 416 or particular server 418 the message is to be communicated to. By using front door 414, the actual implementation of servers 416 and 418, such as which servers are responsible for managing data regarding which users, is abstracted from security gateway 404. Security gateway 404 can simply forward messages that target the presence and notification service to presence and notification front door 414 and rely on front door 414 to route the messages to the appropriate one of server(s) 416 and server(s) 418.

Match server(s) 422 hold and process data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 420 includes one or more server devices (and optionally a load balancing device(s)) and operates to abstract match server(s) 422 from security gateway 404 in a manner analogous to front door 414 abstracting server(s) 416 and server(s) 418.

Statistics server(s) 426 hold and process data concerning various statistics for online games. The specific statistics used can vary based on the game designer's desires (e.g., the top ten scores or times, a world ranking for all online players of the game, a list of users who have found the most items or spent the most time playing, etc.). Statistics front door 426 includes one or more server devices (and optionally a load balancing device(s)) and operates to abstract statistics server(s) 426 from security gateway 404 in a manner analogous to front door 414 abstracting server(s) 416 and server(s) 418.

Thus, it can be seen that security gateway 404 operates to shield devices in the secure zone of data center 410 from the untrusted, public network 406. Communications within the secure zone of data center 410 need not be encrypted, as all devices within data center 410 are trusted. However, any information to be communicated from a device within data center 410 to a game console 402 passes through security gateway cluster 404, where it is encrypted in such a manner that it can be decrypted by only the game console 402 targeted by the information.

Illustrative Embodiments of the Invention

Voice Chat

One or more aspects of the invention may be embodied in computer-executable instructions (i.e., software), such as in a game console control application software module stored in RAM memory 206, non-volatile memory 108, 208, 308, or any other resident memory on game console 102. Generally, software modules include routines, programs, objects, components, data structures, etc. that perform particular tasks or implement particular abstract data types when executed by a processor in a computer or other device. The computer executable instructions may be stored on a computer readable medium such as a hard disk 208, removable storage media 108, solid state memory, RAM 206, etc. As will be appreciated by one of skill in the art, the functionality of the software modules may be combined or distributed as desired in various embodiments. In addition, the functionality may be embodied in whole or in part in firmware or hardware equivalents such as application specific integrated circuits (ASIC), field programmable gate arrays (FPGA), and the like.

The network gaming environment 400 may allow users to invite other users to participate in a gaming session. Each user of the network gaming environment may maintain a 'Friends list' identifying players with whom that user wants to be kept informed when the players are online, as is known in the art. For example, a user with the online ID (also referred to as a gamertag) Aviator might have a Friends list identifying users with the gamertags finebokeh, flyerscaps, laBWrats, Doc, and Thrasher. When Aviator is signed in to the network gaming environment 400, the presence server 416 can inform Aviator when any of finebokeh, flyerscaps, laBWrats, Doc, or Thrasher are also signed in to the network gaming environment 400. If Aviator wants to play a game, e.g., TOP SPIN tennis, with finebokeh from Aviator's Friends list, upon determining that finebokeh is also signed in Aviator can send a game invitation to finebokeh by sending a message through notification server 418. Notification server 418 in turn forwards the message to finebokeh, instructing finebokeh to insert the TOP SPIN game media into game console 402 if not already inserted.

With additional reference to FIGS. 1-8, when a user of a game console 100 powers on the game console without a game title in the portable media drive 106, the game console loads console application 260 providing a default application and user interface for the user to interact with the game console 100, e.g., to perform console setup (date, time, etc.), music playback, memory management, network setup and management, and the like. According to an aspect of the invention, the console application 260 may be adapted to include voice chat support, thus eliminating the need to have the same game media as a Friend in order to meet up and voice chat to discuss game plans. Voice chat in the console application provides a catalyst for building a better online community, and allows gamers to quickly and easily get together with Friends in a virtual lobby with the ability to talk to each other. In one embodiment of the invention, in order to support large communities to gather, the voice chat feature may allow up to 16 users, or Friends, to meet together concurrently in a voice chat session. However, more or less than 16 may alternatively be allowed, depending on system needs, capabilities, bandwidth, design choices, etc.

Figure 5:
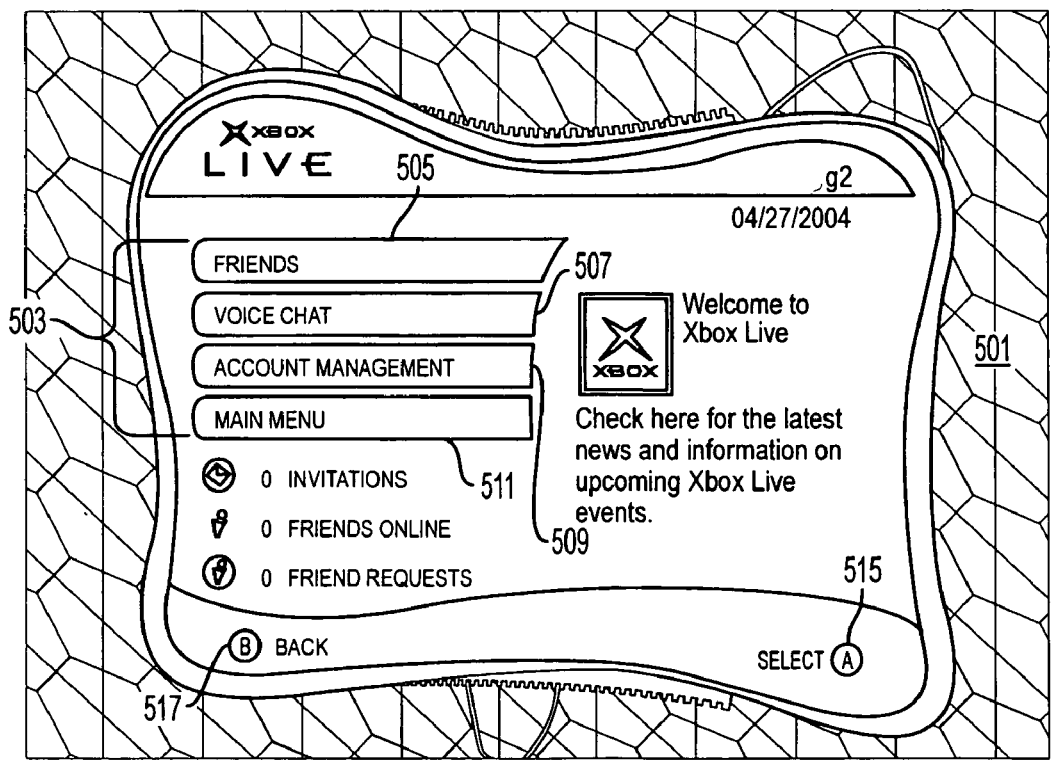
FIG. 5 illustrates a screenshot of an online gaming environment menu screen according to an illustrative embodiment of the invention.

FIG. 5 illustrates a main network menu screen 501 of a console application according to an illustrative embodiment of the invention. Main network menu screen 501 may include a menu 503 having menu items including Friends 505, Voice Chat 507, Account Management 509, and Main Menu 511. The 'A' button on game controller 104 may be used to select a currently highlighted menu item, whereas the 'B' button on game controller 104 may be used to navigate back up the menu hierarchy of game console 100, as illustrated by control indicators 515, 517. The main network menu screen 501 may include other information, such as the number of Friends online, outstanding game invitations, and the like.

Upon selecting the Voice Chat option 507, the console application may ask the user for an account passcode (not shown) to verify that the user is the owner of the account being accessed. Upon successful completion of the passcode challenge, the console application retrieves the user's Friends list and queries the presence and notification servers 416 and 418, respectively, to determine which Friends 505, if any, are concurrently signed in to the online gaming environment 400.

Figure 6:
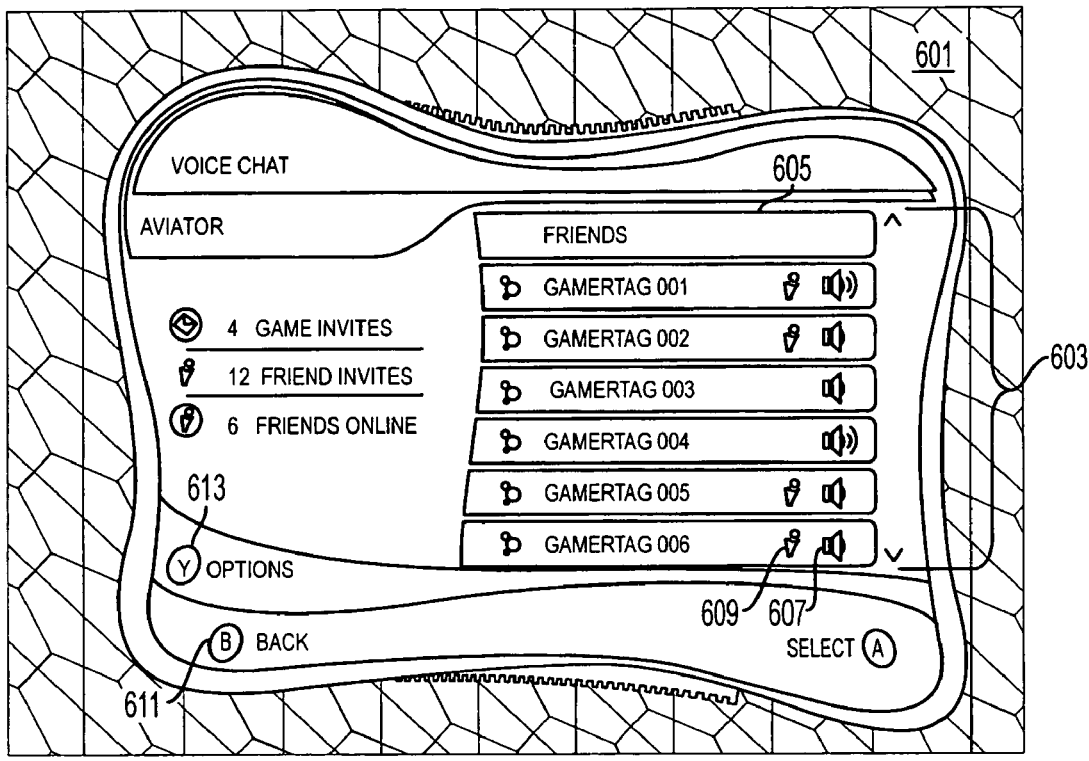
FIG. 6 illustrates a screenshot of a voice chat menu screen according to an illustrative embodiment of the invention.

With reference to FIG. 6, console application 260 displays out-of-game voice chat screen 601 including voice chat list 603. An out-of-game voice chat, as used herein, refers to a voice chat that executes from a non-removable memory associated with game console 102, and that is capable of executing independently of a computer or video game that can execute on game console 102. While the inventors recognize that virtually any memory can be removed with enough effort, by non-removable the inventors refer to a memory not used by default to store primary game media files (i.e., it may store save game or state info, but is not used as primary storage for game executables). Examples of non-removable memory may include a hard disk drive. Examples of removable memory may include CD or DVD drives.

Figure 7:
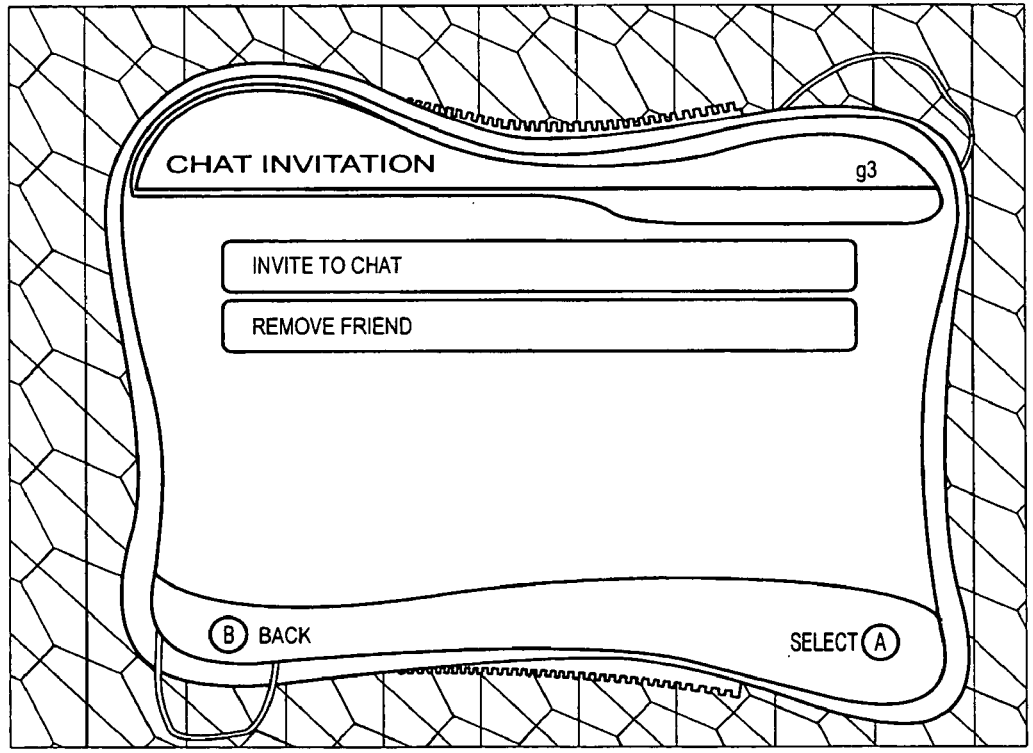
FIG. 7 illustrates a screenshot of an option screen for a user on a Friends list according to an illustrative embodiment of the invention.

Voice chat list 603 displays all gamers currently in the voice chat session. The console application may display a Friends button 605 at the top of the voice chat list which, upon selection by the user, causes the console application to display the user's Friends list. The user can select a Friend from his or her Friends list, which causes the console application to bring up a contextual menu with an option to "Invite to Chat," as illustrated in FIG. 7. Upon selecting the "Invite to Chat," the console application sends a chat invitation to the selected Friend. The selected Friend then receives the invitation voice chat. The invited Friend can accept the voice chat invite and the console application navigates the invited Friend to the voice chat session area of his or her own game console's console application. The voice chat screen 601 may optionally include additional information such as player statistics, rankings, etc.

Once in a voice chat session with a Friend or Friends, players may use headset 142 to talk to each other in real-time voice. If a gamer does not have a speaker/microphone appropriately connected (e.g., the headset connected to a game controller), the voice from others in the voice chat session may be played through the television or stereo speakers. In this way, gamers are still able to be a part of the voice chat community even though they cannot themselves speak to the other players in the voice chat session. Additionally, this allows multiple persons in the same physical room to listen.

Figure 8:
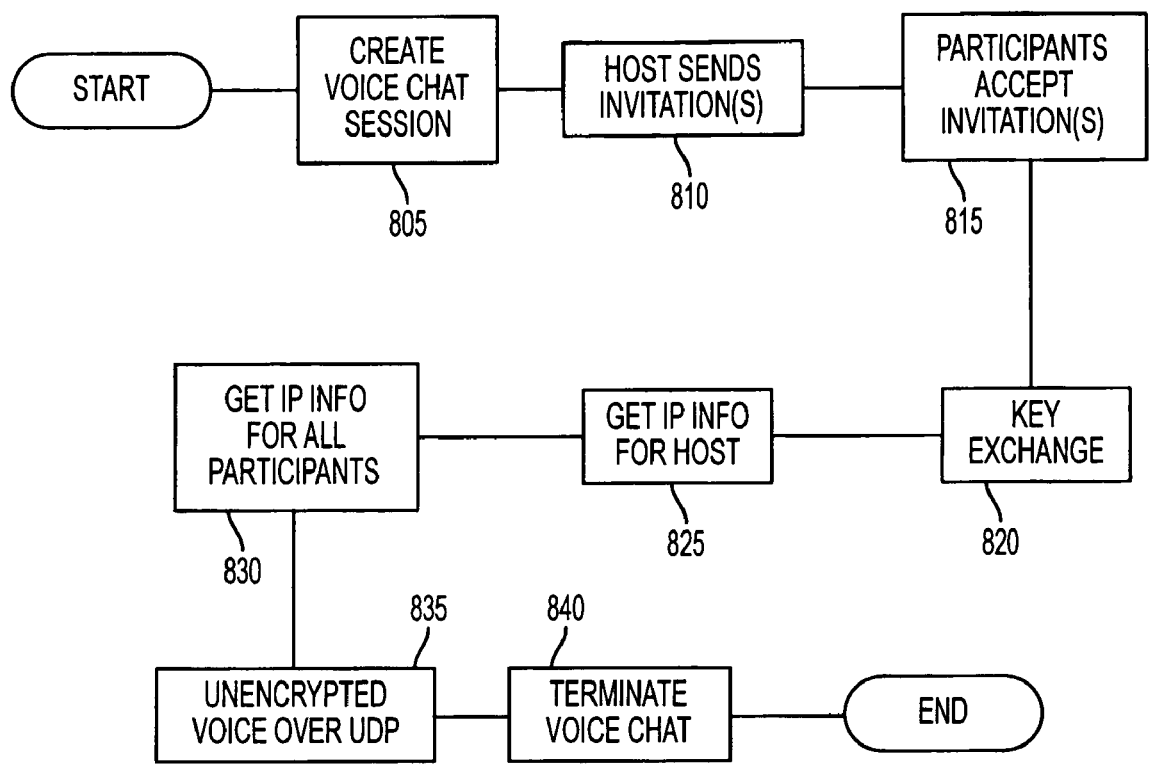
FIG. 8 illustrates a method for administering a voice chat according to an illustrative embodiment of the invention.

While the invention has been thoroughly described above, a more detailed method for establishing and administering a voice chat session will now be described with reference to FIG. 8. The method of claim 8 starts when a user decides he or she wants to initiate a voice chat with another user. The initiating user, referred to herein as the host, creates a voice chat session in step 805. The host can initiate a voice chat session in a variety of ways. First, the host can select the voice chat option 507 (FIG. 5) from the main network menu screen 501. Upon selecting the voice chat option, and entering his or her pass code if not already signed in to the online gaming environment, the host's console 100 sends a voice chat session request to online service 304, e.g., to data center 410. Data center 410 records a host ID, creates a new voice chat session ID, and sends the session ID for the voice chat session to host.

Alternatively, the host may select Friends option 505 from menu screen 501. Selecting Friends option 505 causes the console to retrieve and update the host's Friends list, including online/offline status of users on the Friends list, and outstanding Friend invitations, and outstanding game invitations. The host, being able to see which Friends (if any) are also online, can select a Friend from on the Friends list. Upon selecting the Friend, the console may provide the host with a number of options to perform based on the selected Friend, one of which may be 'Voice Chat'. Upon selecting the Voice Chat option the host's console 100 sends the voice chat session request to online service 304, e.g., to data center 410. Data center 410 records a host ID, creates a new voice chat session ID, and sends the session ID for the voice chat session to host.

Once the voice chat session has been created, the host in step 810 can invite other users to participate in the voice chat. In the second scenario discussed above, where the host selects a Friend to chat with from the Friends list options menu, the invitation may be automatically sent to the selected Friend without further input from the host. In the other scenario, where the host selects Voice Chat from the menu 503 on network screen 501, the host manually selects additional users to invite to the voice chat by selecting the Friends button 605 on voice chat screen 601, causing the host's Friends list to be displayed, similar to selecting Friends option 505 from network screen 501. The host can subsequently select a Friend or Friends to which additional invitations will be sent.

In some embodiments of online gaming environment 400, each invitation preferably includes at least a session ID, and a title ID identifying the game title to which the invitation pertains. The invitation may also include inviting user and invitee data. For example, for a situation where GAMERTAG002 sends an invitation to GAMERTAG005 to play the game CRIMSON SKIES®, the invitation would preferably include a session ID, a title ID (e.g., information relating to the game CRIMSON SKIES®), the ID of the inviting user (e.g., GAMERTAG002), and the ID of the invitee (e.g., GAMERTAG005). In the case where a user wants to have an out-of-game voice chat with another user, in order to maintain consistency and user compatibility with the game play related invitations, each invitation would preferably still have a session ID, and inviting user and invitee data. It also preferably has a title ID, except the title ID would not corresponding to the name and data of a specific game but would instead correspond to an out-of-game voice chat application resident on the game console. Accordingly, such a title ID would not have a "game title" ID but would designate details relating to the out-of-game chat application. Thus, for a situation where GAMERTAG002 sends an invitation to GAMERTAG005 to voice chat, the invitation would preferably include a session ID, a title ID equivalent to an out-of-game voice chat application resident on the game console, the ID of the inviting user (e.g., GAMERTAG002), and the ID of the invitee (e.g., GAMERTAG005). In some embodiments, the invitation may also include a recorded voice message from the voice chat host, e.g., describing a subject matter of the voice chat, a personal greeting, or the like. The recorded voice message may be any length depending on system capabilities. In one embodiment, in order to conserve resources, up to a fifteen second recorded message may be used. Console 100 then sends the invitation to data center 410 for transmission to the invitee via presence and notification servers 416, 418, respectively.

Upon receiving an invitation, an invitee can decide to accept the invitation in step 815. If not already signed in to the online gaming environment 400, the invitee may be required to perform security checks and authentication in step 820. Security and authentication may include performing a key exchange with key distribution center 428. Once an invitee has completed security and authentication, invitee obtains the host's IP address in step 825 from data center 410. The invitee sends an introduction message to the host in step 830, and obtains the IP addresses of all voice chat participants. The host, likewise, notes the IP address for each participant from which it receives an introduction message.

Once the host and each invitee have the IP addresses for all voice chat participants, the voice chat commences in step 835. During the voice chat, each user's voice is compressed using any known voice or audio codec. For example, a voice or audio codec from Nellymoser, Inc. of Arlington, Mass. may be used, or a Windows Media 9 voice or audio codec, available from Microsoft Corporation of Redmond, Wash., may alternatively be used. One of skill in the art will appreciate that any now known or later developed voice and/or audio codec may be used to suit the needs of the specific voice chat implementation. The compressed voice data may then be sent encrypted or unencrypted to all voice chat participants, based on the known IP addresses of the participants. That is, because IP information is exchanged between all voice chat participants, the voice chat participants are connected as a sort of interconnected mesh, independent of a voice chat server, and can communicate directly with each other.

A voice chat participant can terminate or exit the voice chat in step 840. A non-host participant, upon selecting the back (B) option 611, may be automatically terminated from the voice chat session or may be given the option to confirm exiting or staying in the voice chat. When the host user selects Back option 611, the data center removes the session information for that voice chat session and the voice chat session may be terminated for all voice chat participants (because the host was the registered user with data center 410 for that particular voice chat session).

Alternatively, in some embodiments, the voice chat session may continue even after the original host exited the voice chat. This may be accomplished using a host-migration chat model. For example, the data center 410 may keep track of multiple voice chat participant IP addresses per voice chat session, e.g., a primary and backup host, instead of merely the session host. If the primary host exits the voice chat session, the data center 410 may move the backup host to the primary host slot, and select a new backup host from the remaining voice chat participants (e.g., by requesting the new host to identify an IP address of a remaining participant). If the backup host exits the voice chat session, the data center 410 may simply select a new backup host from the remaining voice chat participants.

While the above description provides details for a voice chat in a console application, in some embodiments the voice chat may incorporate one ore more usability and/or special features to enhance the voice chat experience for voice chat participants. For example, the console application may use sound effects to reinforce when a player has joined or left the chat session or signed in or out of the online gaming environment; the 'Host' (i.e., the first person in the chat session) may have the ability to select a gamer in the voice chat session and change the user's voice chat settings (e.g., kick him or her from the voice chat session if the host feels it necessary to do so, or change the voice masking effect currently applied to that user, if any); and the console application may use visual feedback to identify a current speaker by flashing a speaker icon 607 next to the player currently speaking in the voice chat session, or provide a Friends icon 609 to identify players currently on a player's own Friends list. Friends icon 609 may be used because there may be non-friends on the list who entered the chat via a shared friend. For example, A and B are friends, and B and C are friends. A invites B to the chat, and B then invites C to the chat. A, B and C are all then in the chat, but A and C are not presently friends. A can send C a friend request by selecting C on the voice chat screen and selecting an "add to friends list" or similar option.

For example, in the example illustrated in FIG. 6, Aviator is in a chat sessions with users with gamertags GAMERTAG001, GAMERTAG002, GAMERTAG003, GAMERTAG004, GAMERTAG005, and GAMERTAG006. Furthermore, FIG. 6 illustrates that GAMERTAG001 and GAMERTAG004 are both currently talking, and that all users participating in the chat session except for GAMERTAG003 and GAMERTAG004 are currently on Aviator's Friends list. All players in the voice chat session may have the ability to select other garners in the session to either add or remove them from their own Friends list. Aviator can thus add GAMERTAG003 and GAMERTAG004 to his friends list if desired. In this manner, a gamer's circle of Friends can quickly grow to encircle his or her Friends' Friends who are able to join the chat session as well.

In some embodiments, where each voice chat session is registered with match server 422 and a voice chat session host has designated the session as being open to non-Friend participants, users may be able search for a chat session based on various criteria and/or user profile information. For example, a user may search for an open voice chat session based on ranking or skill level of voice chat participants (or simply the host), games or game types played, game attitude (e.g., hard core, spare time player, socialite, etc.), or any other information tracked by the online game environment 400.

In some embodiments the host (either exclusively or non-exclusively of other voice chat participants) can initiate a vote in the voice chat session, e.g., by selecting options button 613 and selecting 'Create Vote' (not shown). The host can enter a question with a known answer domain (e.g., yes/no; true/false; A/B/C/D, etc.) and submit the question for a vote. Each voice chat participant, optionally including the host, then responds to the question by manipulating the controls on controller 104 (e.g., move joystick up for yes/true/A; move joystick down for no/false/C; move joystick right for B, move joystick left for D). In this manner voice chat participants can vote yes/no for whether a certain action should be taken (e.g., whether to play a game proposed by the host; true/false for responding to appropriate vote questions; or select an A, B, C, or D answer from a proposed set of answers such as which of four proposed games to play together). Other options (not shown) that may be available upon selection of option button 613 include an option to appear offline to non-voice chat participants when in a voice chat session and to force voice chat sound through the TV speakers, regardless of whether a microphone is connected.

In some embodiments there may be a whisper mode (also referred to as 'secret' mode) whereby a voice chat participant can optionally speak to only a designated other voice chat participant, even when there are more than two voice chat participants in a given voice chat session. In such an embodiment, a user may select a voice chat participant from list 603, and one of the resulting options may be 'Whisper'. Upon selecting Whisper, the voice chat screen 601 may be modified slightly to indicate that the user's subsequent speech will only be sent to the selected user until such time as the user exits the whisper mode, e.g., by selecting the back button (B) or by releasing a button that was otherwise used to enter the whisper mode. In some embodiments, the user may configure a control input on the controller 104 such that whenever the user is activating the selected control input, voice data will only be sent to a specified user corresponding to that control input. In some embodiments, the user may set up multiple whisper modes, e.g., whisper to a first user when holding the 'X' button, whisper to a second user when holding the 'Y' button, whisper to a third user when holding the left trigger, etc.

Similar controls may be set up to control voice masking effects used during the voice chat. That is, a user might configure their voice chat settings to indicate that, by default, no voice masking should be used, but that a cheerleader voicemask should be used while the thumbpad is pressed the left, a robot voicemask should be used while the thumbpad is pressed to the right, etc. The controls used here are illustrative only, and one of ordinary skill in the art will appreciate that whisper and voicemask settings may be mapped to any otherwise unused control input or combination of control inputs on controller 104.

In some embodiments voice chat may include a video chat option. In such an embodiment, a user need only have a video camera peripheral connected to game console 102 and have a video chat option selected. In such a scenario, video may be compressed using a video codec and sent to the other voice chat participants similar to compressed voice data.

According to an aspect of the invention, voice chat participants may be able to share files during voice chat. That is, when game console 102 is able to store files on hard disk drive 208, e.g., music files, picture files, saved game files, etc, a voice chat participant desiring to send a file to another voice chat participant may select a desired recipient from list 603 and select a 'Send File' option (not shown). The sending user then navigates through a hierarchical menu or file system to locate the desired file to send to the other user. Upon selecting a file, the game console 102 sends the selected file to the selected user based on the known IP address of the selected user, e.g., using TCP/IP, FTP, etc. A reciprocal "Send to User" command may appear on an options menu when navigating a file system external to the voice chat. In some embodiments, a user may specify a music file for playback during the voice chat session, whereby the game console both plays back the selected audio file and sends the audio file to the voice chat participants, whose game consoles automatically play the transmitted audio file as background music to the voice chat.

Emoticons

In some embodiments of the invention, a participant in a voice chat session can send an emoticon to another participant in the voice chat. As used herein, the term emoticon is broadly defined as a conveyance of emotion or action in a chat session from one participant to another over the network in a manner using neither the primary means of communication of the chat session nor game-play features (when chat is in-game). For example, in a voice chat, an emoticon may include virtually anything sent over the network, other than one participant speaking directly to the one or more other voice chat participants. If a chat session is in-game, a player-character performing an action in-game that can be otherwise performed during game play is not considered an emoticon.

Gaming system environment 100 includes A/V interfacing cables 120 for outputting visual display elements to video and auditory elements to one or more speakers. Gaming system environment 100 also includes one ore more controllers 104, which may further incorporate force feedback capabilities. Force feedback, generally, refers to the ability of a controller to exert positive force, e.g., by vibrating or rumbling, or by actively exerting pressure on a control input such as a joystick, flight yoke, or driving wheel. Using these capabilities of gaming system environment 100, a voice chat session can provide dynamic emoticon capabilities that encompass the haptic (touch), visual (sight), and/or auditory (hearing) senses, thus enabling one participant to physically affect another participant's gaming system environment.

Haptic emoticons affect the sense of touch. For example, haptic emoticons may include rumbling or vibrating another voice chat participant's controller 104, and causing another voice chat participant's joystick, flight yoke, or driving wheel to physically move without receiving input from the other voice chat participant.

A visual emoticon can be anything that causes another voice chat participant's display to be altered. Examples of visual emoticons are endless. For example, there may be visual effects emoticons that affect another voice chat participant's display. A 'negative' emoticon may cause another voice chat participant's display to switch to a negative image; a 'melt' emoticon may cause another voice chat participant's display to appear as if it is melting off the screen; and a 'blur' emoticon may cause another voice chat participant's display to appear blurry and unfocused so that the other voice chat participant cannot easily focus or make menu selections. These are merely three examples of possible visual effects emoticons. Visual emoticons may also include more traditional icons, graphics or animations displayed on the voice chat screen 601 (FIG. 6), either on the screen in general, or next to the voice chat participant sending the emoticon. For example, if GamerTag003 sends a smiley face emoticon, e.g., :), :-) or ☺, the emoticon may be displayed next to GamerTag003 on list 603; if the emoticon includes an animation of a fist pounding the screen, the emoticon may be displayed on a larger portion of the view screen.

Auditory emoticons are likewise endless in possibility. An auditory emoticon is one which causes sound to be output via another participant's gaming system 102, or one which affects sound output via another participant's gaming system 102, and may be desirable to summon a participant who has not spoken in a voice chat session for some time, or to simply show emotion of give commands to a fellow voice chatter. Auditory emoticons may be as simple as one voice chat participant causing a "beep" to be output through the gaming system 102 of another voice chat participant, or may initiate playback of a more complex or synthesized sound, such as a fog horn, or prerecorded sounds, such as music, speech, or the like. An auditory emoticon may also affect sound otherwise output through another participant's gaming system 102. For example, an 'echo' auditory emoticon may cause all sound output via the selected participant's gaming system 102 to have an echo sound effect; a 'radio noise' auditory emoticon may cause all sound output via the selected participant's gaming system 102 to have static similar to a bad radio signal; a 'cavern' auditory emoticon may cause all sound output via the selected participant's gaming system 102 to sound as if the speaker were in a large cavern or other large room. Auditory emoticons that affect sound may be applied by emoticon recipient game console 102 using a selected sound effect filter for the duration of the auditory emoticon.

Any combination of haptic, visual, and auditory elements may be combined in a single emoticon, referred to herein as a combination emoticon. An example of a combination emoticon imitates an 'earthquake' emoticon that causes the controller to rumble or vibrate (haptic), causes the display to blur or shake violently (visual), and plays a sound of a large structure collapsing (auditory). Another example of a combination icon imitates an electromagnetic pulse (EMP) by applying a degaussing effect on the video display and outputting appropriate electrical sounds via the speakers. Other examples might include images with added animated visual and/or audio effects that appear on screen for the selected recipient(s), such as an animated smiley face or a rock fist that pounds the screen, shaking all content presently onscreen. These are but a few examples of combination emoticons, and those of skill in the art will appreciate that endless possibilities of combination emoticons may be subsequently designed.

Figure 9:
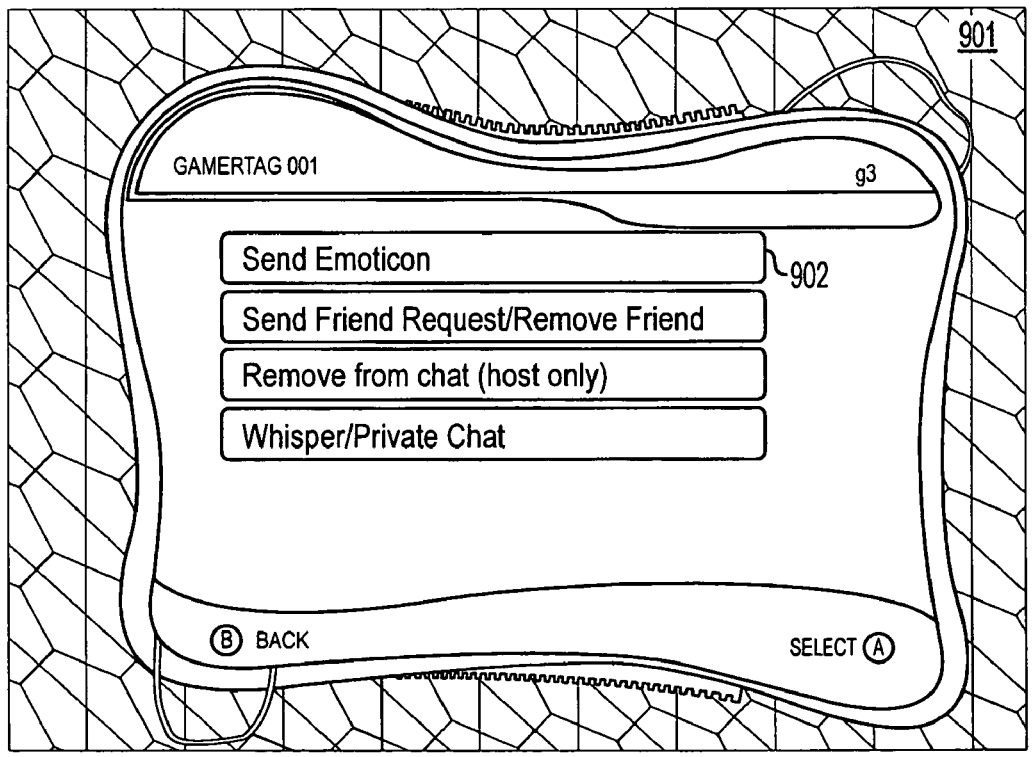
FIG. 9 illustrates a screenshot upon selection of a user in a voice chat according to an illustrative embodiment of the invention.

A voice chat participant may send an emoticon to another voice chat participant in various ways, depending on the design and user interface of the particular network gaming environment in which voice chat and emoticons are implemented. In one illustrative embodiment, with reference to FIG. 6 and FIG. 9, when a voice chat participant selects another voice chat participant from voice chat screen 601 (FIG. 6), for example selecting the voice chat participant with gamertag GamerTag001, the game console 102 may display a menu 901 (FIG. 9) displaying options with respect to the selected voice chat participant. As discussed above, options may include inviting the selected voice chat participant to join the selecting participant's Friends list (or removing the selected voice chat participant from the selecting participant's Friends list, if already on it), removing the selected voice chat participant from the voice chat session (this option might appear only to the host of the voice chat session), and sending a whisper or private chat to a user. Another option that may be displayed is an option 902 to send an emoticon to the selected voice chat participant.

Figure 10:
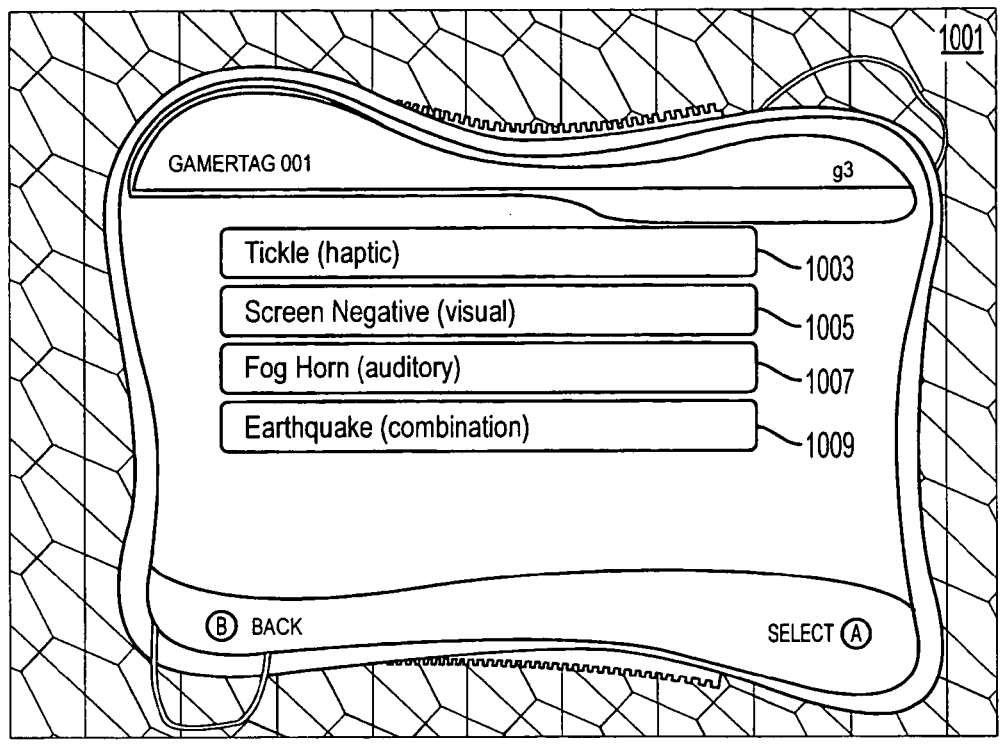
FIG. 10 illustrates a screenshot of a submenu upon selection of the emoticon option in FIG. 9 according to an illustrative embodiment of the invention.

Upon selection of emoticon option 902, the game console may display an emoticon submenu 1001, such as that illustrated in FIG. 10, that provides a list of emoticons that may be sent from one voice chat participant to another. FIG. 10 illustrates an emoticon submenu in an illustrative embodiment where a voice chat participant may select from any of four emoticons to send to another voice chat participant, including a haptic tickle emoticon 1003, a visual screen negative emoticon 1005, an auditory fog horn emoticon 1007, and a combination earthquake emoticon 1009.

Upon selecting the desired emoticon, the selecting voice chat participant's game console 102 sends emoticon information (discussed below) to the game console of the selected voice chat participant, resulting in the recipient's game console performing the requested emoticon. When the recipient's game console performs the received emoticon, the recipient's game console may simultaneously display an indicator in list 603 (FIG. 6) next to the gamertag of the emoticon sending voice chat participant, highlight the sender, or provide some other indication of the emoticon sending voice chat participant.

In one illustrative embodiment, the emoticon execution may occur for as long as the selecting voice chat participant continues pressing the select button 'A,' optionally up to a maximum length of time. In another embodiment, the emoticon may be instance based, occurring only once for a predetermined length of time each time the select button 'A' is pressed.

According to an aspect of the invention, the haptic, auditory, visual, and/or combination emoticons may have an associated intensity level. In one illustrative embodiment, where buttons 136 on controller 104 are pressure sensitive, the intensity level may be based on the pressure with which the button is pressed. Other mechanisms for specifying an intensity level may alternatively be used, such as using incremental intensity by pressing a button once for low intensity, twice for medium intensity, and three times for high intensity.

As shown in FIG. 10, the selecting voice chat participant may use button 'A' to select the tickle emoticon 1003. If the 'A' button on controller 104 is pressure sensitive, the resulting vibration intensity may correspond to the pressure with which the voice chat participant presses the 'A' button. Softer pressure results in lower resulting vibration intensity; harder pressure results in stronger resulting vibration intensity. An example of a pressure sensitive auditory emoticon may be a 'train whistle' emoticon, where the train whistle grows louder as the pressure is increased on the selecting button 'A'. An example of a pressure sensitive visual emoticon may be a 'blur' emoticon where the selected voice chat participant's display grows blurrier as the pressure is increased on the button.

Similarly, combination emoticons may also have pressure sensitive elements across their haptic, auditory, and or visual aspects. For example, the 'earthquake' emoticon may rumble stronger, shake screen more violently, and play the crashing sound effect louder as the pressure is increased on the button.

Figure 11:
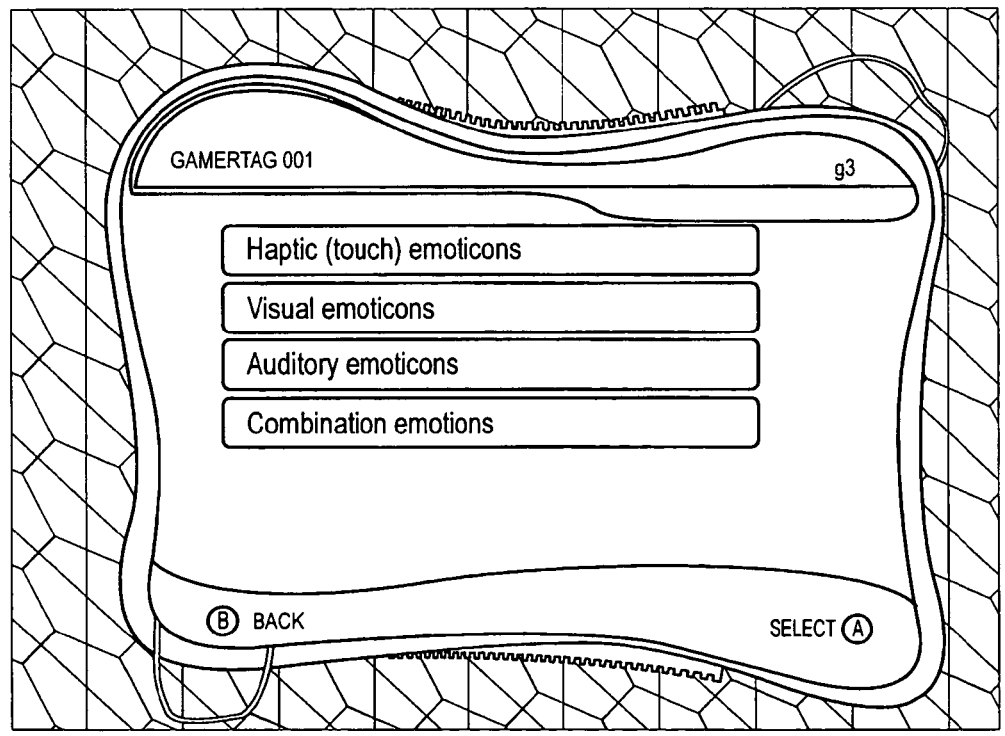
FIG. 11 illustrates an alternative screenshot of a submenu upon selection of the emoticon option in FIG. 9 according to another illustrative embodiment of the invention.

Each game console 102 participating in a particular voice chat session need only know the range of emoticons available in order to provide emoticon services to voice/video chat sessions. Each game console may be statically programmed with a known list of emoticons. For example, as illustrated in FIG. 10, there are four possible emoticons. More or less emoticons may be provided. Where more emoticons are available, game console 102 may use hierarchical submenus to allow a voice chat participant to navigate to a desired emoticon, such as is illustrated in FIG. 11, or may provide a virtual onscreen keyboard or menu from which a user can select an emoticon using controller 104. Alternatively, where fewer emoticons are available, they may be placed directly (not shown) on menu 901. An identifier identifying the selected emoticon is subsequently sent from the sender's game console to the recipient's game console, as described below.

Figure 12:
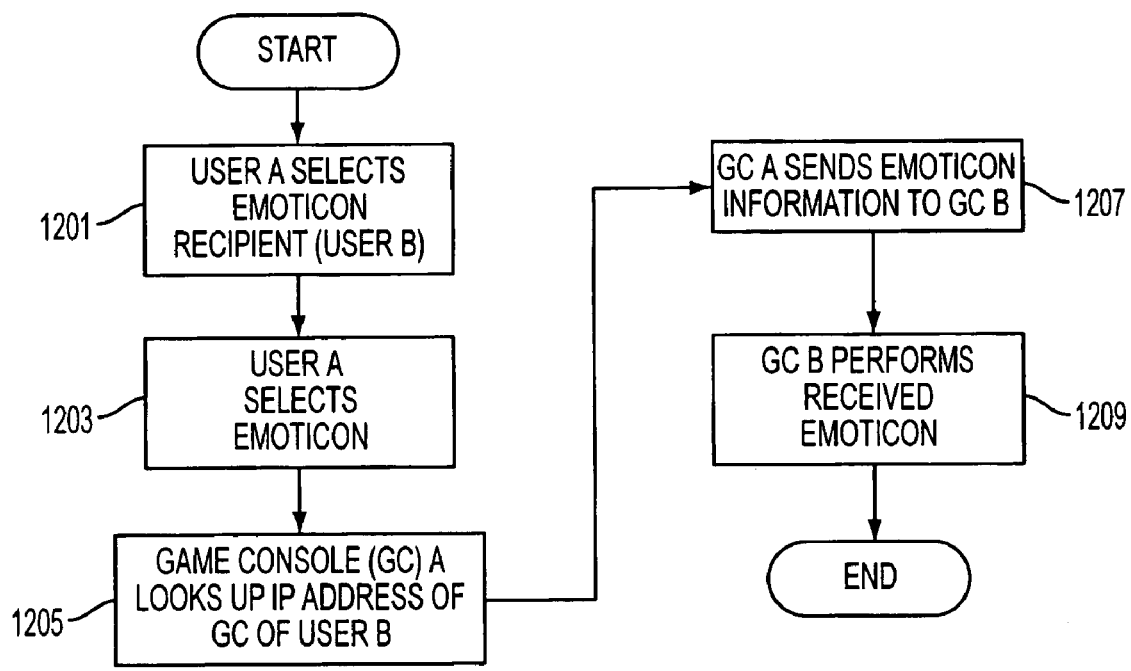
FIG. 12 illustrates a method for sending a dynamic emoticon in a voice chat according to an illustrative embodiment of the invention.

FIG. 12 shows a flowchart for an illustrative method to send a dynamic emoticon from a sending voice chat participant (User A) to a recipient voice chat participant (User B). Initially, in step 1201, User A selects emoticon recipient User B, e.g., the participant with gamertag GamerTag001, from voice chat screen 601 (FIG. 6). Next, in step 1203, User A selects the emoticon to send to User B by selecting the emoticon from one or more menus (see, e.g., FIGS. 9-11, and above description thereof) displayed as a result of selecting a voice chat participant from screen 601. In step 1205, User A's game console (GC-A) looks up the IP address of the game console (GC-B) corresponding to User B. GC-A can look up the IP address, e.g., in a lookup table stored in its own memory based on the IP address information received as part of the voice chat session (described above). Those of skill in the art will appreciate that other address and/or lookup mechanisms may alternatively be used, as are known in the art.

In step 1207 GC-A composes an emoticon instruction message and sends it via one or more data packets (e.g., using TCP/IP) over network 302 and/or network 406 to GC-B corresponding to User B. Each emoticon instruction message includes, at a minimum, sender identification (e.g., gamertag, IP address, etc.), recipient identification, and an emoticon identifier (e.g., 1=Tickle, 2=FogHorn, 3=Earthquake, etc.; "Tickle," "Foghorn," "Earthquake," etc.) based on the universe of emoticons common to all game consoles in the networked gaming environment. If the emoticon is intensity-based, then the emoticon instruction message may further include an intensity level. For combination emoticons, the emoticon instruction message may include an intensity level (e.g., 1, 2, 3, ... ) for each channel (haptic, auditory, visual) of the emoticon that is pressure sensitive, or it may include a single intensity level for all channels. For continuous emoticons that occur as long as the select button remains depressed, GC-A may continuously stream emoticon instruction messages to GC-B until such time as the selected button is released, or the emoticon instruction message may include a duration. Alternatively, GC-A may send a START continuous emoticon message with the requisite details to GC-B. When the selected button is released GC-A may send a STOP continuous emoticon message to GC-B. Upon receipt of the emoticon instruction message in step 1209, GC-B performs the selected emoticon identified and/or defined in the emoticon instruction message, and displays the emoticon indicator on screen 601 indicating the voice chat participant who sent the emoticon.

Figure 13:
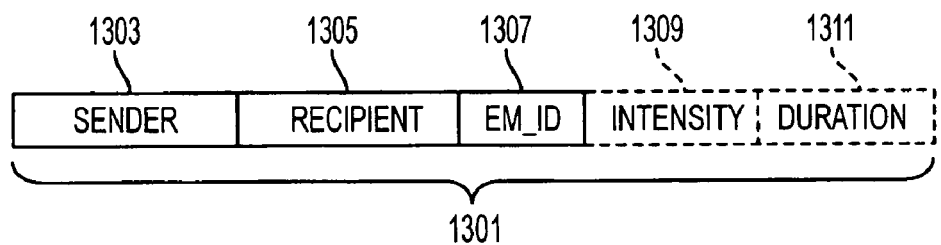
FIG. 13 illustrates an emoticon instruction message according to an illustrative embodiment of the invention.
Figure 14:
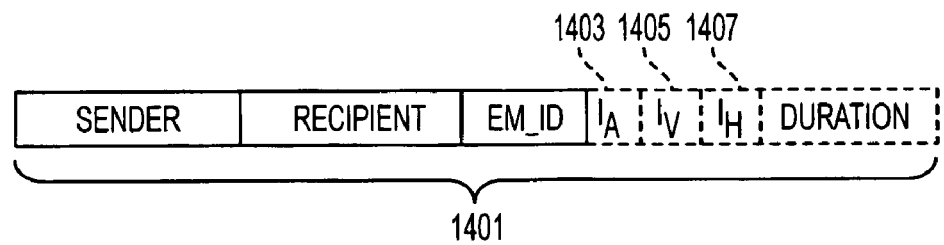
FIG. 14 illustrates an emoticon message according to another illustrative embodiment of the invention.

FIG. 13 illustrates a sample emoticon instruction message 1301 according to an illustrative embodiment of the invention. Message 1301 includes a sender data 1303, recipient data 1305, and emoticon identifier data 1307. Message 1301 may optionally include, shown in broken lines, intensity level data 1309 and duration data 1311. FIG. 14 illustrates an alternative sample emoticon instruction message 1401 where separate intensity level data is provided for each component of the emoticon. Intensity data 1403 provides an intensity level for the auditory component; intensity data 1405 provides an intensity level for the visual component, and intensity data 1407 provides an intensity level for the haptic component.

The above method and system are one illustrative embodiment of how dynamic emoticons can be performed. Those of skill in the art will appreciate that modifications and changes may be made while still within the spirit and scope of the invention. For example, in a possible alternative embodiment, while in a voice chat session a button 136 (e.g., 'Y'), trigger (e.g., left trigger), or other control input may be permanently or temporarily mapped to an emoticon or an emoticon mode. If mapped to an emoticon, e.g., Tickle, whenever the mapped control input is pressed or actuated by a voice chat participant, that voice chat participant's game console 102 sends a tickle emoticon message to the game console corresponding to the presently selected voice chat recipient on voice chat screen 601. The tickle command may further have an intensity based on the button pressure. If mapped to an emoticon mode, whenever the mapped control input (e.g., left trigger) is pressed or actuated by a voice chat participant, the voice chat participant may simultaneously actuate another control input to send an emoticon mapped to that other control input. When two emoticons are sent in succession so that the receiving game console has not finished executing the first emoticon when the second emoticon is received, the receiving game console may fade the first emoticon into the second successive emoticon, or in the case an emoticon that has a defined period, the receiving game console may wait for the first emoticon to finish execution before executing the second emoticon. If the two emoticons do not compete for the same channel, the receiving game console may execute both emoticons simultaneously. If two emoticons are competing for the same channel (i.e., audio, visual, haptic) the receiving game console may override the channel with the most recently received emoticon. Any combination or alternative of the above resolution methodologies, or other resolution methodologies, may be used.

In another alternative embodiment, a voice chat participant may send a custom emoticon to another voice chat participant, e.g., by sending a graphic or audio file stored on the hard drive of the sending voice chat participant's game console. In such an embodiment, when the user selects 'custom emoticon,' his or her game console displays a file navigation menu to allow the user to select the file containing the audio or graphic to send to the recipient, similar to a file transfer, except that the graphic or audio file is not saved on the recipient's system after it has been output via the display and/or speakers accordingly.

In another alternative embodiment, custom emoticons may include script that instructs a recipient's game console to execute an emoticon according to the provided instructions. In such an embodiment, the script language (known to each game console) may define basic elements of emoticons (e.g., haptic, auditory, and visual channels), and actions that can be performed (e.g., haptic actions such as vibrate and force feedback, visual actions such as displaying icons and performing screen effects, and auditory actions such as playing sounds and implementing sound effects), and users can create custom emoticons by combining elements and actions as desired.

In yet another alternative embodiment, additional emoticon elements may be provided in addition to haptic, visual, and auditory. For example, an emoticon may include a system component that controls non-haptic physical characteristics of the emoticon recipient's system. The emoticon may cause one or more LEDs on the recipient's system to blink or flash to signify winking, may eject a media drive tray to signify sticking one's tongue out, and the like. Any electronically controllable aspect of a data processing system may be subject to emoticon control, depending on security and design features of the given system.

Dynamic emoticons as described herein expand on the known emoticon space by adding new dimensions and capabilities for emoticons in a chat session. Dynamic emoticons allow users to send combinations of sound, video, and haptic feedback to other user's televisions, stereos, and game controllers, thus ensuring an innovative, fin and entertaining gaming environment.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

What is claimed is:

1. A user interface generated on a display by instructions stored on a computer-readable medium and executable on a computer, said user interface comprising:
    a list of participants in a voice chat session conducted over a communications network;
    a menu comprising a list of emoticons selectable by a user, each emoticon in the list having corresponding emoticon data, the corresponding emoticon data being sent from the user to a selected one of the participants from the list of participants over the network upon the user selecting the emoticon from the list, the sent corresponding emoticon data comprising a non-vocal and non-textual conveyance of emotion or action from the user to the selected participant in connection with the voice chat session,
    the selected emoticon having a haptic component to be received by and rendered to the selected one of the participants, the haptic component to be rendered by way of a force-feedback sensory stimulator device of a computing device of the selected one of the participants, the force-feedback device rendering the haptic component as movement felt by the selected one of the participants when the selected one of the participants touches the force-feedback device,
    the selected emoticon also having a system component to be received by and rendered to the selected one of the participants, the system component to be rendered by way of one or more physical light elements and an ejectable drive tray of the computing device of the selected one of the participants, the one or more physical light elements rendering the system component by flashing to signify winking and the ejectable drive tray rendering the system component by ejecting to signify sticking one's tongue out.

2. The user interface of claim 1, wherein the list of emoticons comprises an emoticon having an audio component.

3. The user interface of claim 1, wherein the list of emoticons comprises an emoticon capable of having an intensity level.

4. The user interface of claim 3, wherein the intensity level is based on a button pressure input by the user in selecting the emoticon.

5. The user interface of claim 2, wherein the auditory component identifies a prerecorded file.

6. The user interface of claim 2, wherein the auditory component identifies a sound effects filter.

7. The user interface of claim 1, wherein the list of emoticons comprises an emoticon having a visual component.

8. The user interface of claim 7, wherein the visual component identifies a prerecorded file.

9. The user interface of claim 7, wherein the visual component identifies a visual effects filter for modifying existing content displayed on a display device.

10. The user interface of claim 7, wherein the visual component comprises a graphic file for display on a receiving game console, without permanently saving the graphic file on the receiving game console.

11. The user interface of claim 1, wherein the list of emoticons comprises an emoticon based on an emoticon script.

12. The user interface of claim 11, wherein the emoticon script defines script elements and element actions.

13. The user interface of claim 12, wherein the script elements comprise haptic, auditory and visual elements.

14. The user interface of claim 2, wherein the auditory component comprises an audio file for playback on a receiving game console, without permanently saving the audio file on the receiving game console.

15. A method of generating a user interface, comprising:
a game console detecting participants in a voice chat session of which a user of the game console is participating, the voice chat session being conducted over a communications network;
displaying on a display connected to the game console the list of participants in the voice chat session for user selection of an emoticon recipient; and
displaying a list of emoticons selectable by the user to send to the emoticon recipient, each emoticon in the list having corresponding emoticon data, the corresponding emoticon data being sent from the user to the emoticon recipient over the network upon the user selecting the emoticon from the list, the sent corresponding emoticon data comprising a non-vocal and non-textual conveyance of emotion or action from the user to the emoticon recipient in connection with the voice chat session,
the selected emoticon having a haptic component to be received by and rendered to the selected one of the participants, the haptic component to be rendered by way of a force-feedback sensory stimulator device of a computing device of the selected one of the participants, the force-feedback device rendering the haptic component as movement felt by the selected one of the participants when the selected one of the participants touches the force-feedback device,
the selected emoticon also having a system component to be received by and rendered to the selected one of the participants, the system component to be rendered by way of one or more physical light elements and an ejectable drive tray of the computing device of the selected one of the participants, the one or more physical light elements rendering the system component by flashing to signify winking and the ejectable drive tray rendering the system component by ejecting to signify sticking one's tongue out.

16. The method of generating a user interface of claim 15, wherein the list of emoticons comprises an emoticon having an audio component.

17. The method of generating a user interface of claim 15, wherein the list of emoticons comprises an emoticon capable of having an intensity level.

18. In a user interface of a game console, said user interface displayed on a display device connected to the game console, a method of sending an emoticon to a voice chat participant, comprising steps of:
rendering a graphic list of participants in a voice chat session in which a user of the game console is participating, the voice chat session being conducted over a communications network;
receiving input from the user selecting one of the voice chat participants;
receiving input from the user selecting an emoticon to send to the selected voice chat participant, the selected emoticon having corresponding emoticon data, the corresponding emoticon data being sent from the user to the selected participant over the network, the corresponding emoticon data comprising a non-vocal and non-textual conveyance of emotion or action from the user to the selected participant in connection with the voice chat session,
the selected emoticon having a haptic component to be received by and rendered to the selected one of the participants, the haptic component to be rendered by way of a force-feedback sensory stimulator device of a computing device of the selected one of the participants, the force-feedback device rendering the haptic component as movement felt by the selected one of the participants when the selected one of the participants touches the force-feedback device,
the selected emoticon also having a system component to be received by and rendered to the selected one of the participants, the system component to be rendered by way of one or more physical light elements and an ejectable drive tray of the computing device of the selected one of the participants, the one or more physical light elements rendering the system component by flashing to signify winking and the ejectable drive tray rendering the system component by ejecting to signify sticking one's tongue out.

19. The method of claim 18, further comprising the step of rendering a graphic list of emoticons from which the user can choose.

20. The method of claim 18, further comprising sending an emoticon message to a game console corresponding to the selected voice chat participant, said emoticon message conveying information regarding the selected emoticon.

21. The method of claim 20, wherein the emoticon message comprises an auditory component.

22. The method of claim 20, wherein the emoticon message comprises an intensity level.

23. A system for sending an emoticon from a first participant in a voice chat session to a second participant in the voice chat session, the voice chat session being conducted over a communications network, said system comprising for each of the first and second participants:
a display device for outputting video content from a game console to which the display device is connected; and
a force-feedback controller connected to the game console; said force-feedback controller comprising a plurality of inputs for inputting information to the game console, and comprising a force-feedback capability for providing haptic output to a user of the system;
the game console of the first participant further comprising a memory storing executable instructions that, when executed by a processor of the game console of such first participant, cause the game console to perform steps comprising:
rendering on the display device of the first participant a list of participants in the voice chat session;
receiving a selection of the second participant as input from the first participant via the controller of the first participant;
receiving a haptic emoticon command as input from the first participant via the controller of the first participant; and
sending over the network a haptic emoticon message corresponding to the received haptic emoticon command to the game console corresponding to the second participant, the sent haptic emoticon message comprising a non-vocal and non-textual conveyance of emotion or action from the first participant to the second participant in connection with the voice chat session, and further comprising a sensory conveyance to be expressed to the second participant by way of the force-feedback controller of the game console of the second participant,
the sent haptic emoticon message to be received by and rendered to the second participant, the message to be rendered by way of the force-feedback controller of the game console of the second participant, the force-feedback controller rendering the haptic component as movement felt by the second participant when the second participant touches the force-feedback device,
the sent haptic emoticon message also to be rendered by way of one or more physical light elements and an ejectable drive tray of the computing device of the selected one of the participants, the one or more physical light elements rendering the system component by flashing to signify winking and the ejectable drive tray rendering the system component by ejecting to signify sticking one's tongue out.

* * * * *